US009514399B2

(12) United States Patent
Tattersall

(10) Patent No.: US 9,514,399 B2
(45) Date of Patent: Dec. 6, 2016

(54) METHOD AND SYSTEM FOR MANUFACTURING A CARD WITH EDGE INDICATORS

(71) Applicant: BANK OF AMERICA CORPORATION, Charlotte, NC (US)

(72) Inventor: Kenneth G. Tattersall, Wilmington, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 638 days.

(21) Appl. No.: 13/801,661

(22) Filed: Mar. 13, 2013

(65) Prior Publication Data

US 2014/0274641 A1 Sep. 18, 2014

(51) Int. Cl.
G06K 19/04 (2006.01)
B31D 1/00 (2006.01)
B31D 1/02 (2006.01)

(52) U.S. Cl.
CPC ............. G06K 19/041 (2013.01); B31D 1/026 (2013.01)

(58) Field of Classification Search
CPC ........... B31D 1/00; B31D 1/026; B31D 1/027; Y10T 156/1057; G06K 19/041
See application file for complete search history.

(56) References Cited

U.S. PATENT DOCUMENTS

| | | | |
|---|---|---|---|
| D122,493 S | 9/1940 | Maghab | |
| D155,856 S | 11/1949 | Adair | |
| D171,088 S | 12/1953 | Hamilton | |
| D203,325 S | 12/1965 | Stengel | |
| 3,606,777 A | 9/1971 | Watson | |
| D229,912 S | 1/1974 | Bradford | |
| D255,388 S | 6/1980 | Olson | |
| D280,214 S | 8/1985 | Opel | |
| D291,454 S | 8/1987 | Broadfoot | |
| 4,993,301 A | 2/1991 | de los Santos | |
| D332,545 S | 1/1993 | VanderVelden | |
| D335,305 S | 5/1993 | Burns | |
| D364,642 S | 11/1995 | Adler | |
| 5,643,647 A | 7/1997 | Wischusen, III | |
| 5,700,037 A | 12/1997 | Keller | |
| D395,330 S | 6/1998 | Sarno | |
| D396,882 S | 8/1998 | Neal, Jr. | |

(Continued)

OTHER PUBLICATIONS

Related Utility U.S. Appl. No. 13/801,647, filed Mar. 13, 2013.

(Continued)

*Primary Examiner* — Mark A Osele
*Assistant Examiner* — Christopher C Caillouet
(74) *Attorney, Agent, or Firm* — Michael A. Springs; Moore & Van Allen PLLC; Jeffrey R. Gray

(57) ABSTRACT

Embodiments of the invention are directed to methods and systems used to manufacture cards that comprise indicators on the edge of the card stock to help identify the cards. The dies comprise projections formed as ridges, grooves, dimples, burrs, protrusions, or other like projections. The projections on the dies are used to stamp out card stock having the desired indicators. The indicators on the card stock may be projections on the edge of the card stock in the form of ridges, grooves, dimples, burrs, protrusions, or other like projections that provide at least a portion of the edge of the card stock with a textured surface.

20 Claims, 12 Drawing Sheets

(56) References Cited

U.S. PATENT DOCUMENTS

| | | | |
|---|---|---|---|
| 5,857,237 A * | 1/1999 | Dranginis | A47L 1/16 |
| | | | 15/236.02 |
| D412,010 S | 7/1999 | Lindley et al. | |
| 6,224,109 B1 | 5/2001 | Yang | |
| 6,248,199 B1 * | 6/2001 | Smulson | B29C 47/0021 |
| | | | 156/244.12 |
| 6,325,421 B1 * | 12/2001 | Huebner | G06K 19/10 |
| | | | 229/118 |
| D453,161 S | 1/2002 | Pentz | |
| D462,966 S | 9/2002 | Pentz et al. | |
| D468,574 S | 1/2003 | Moore | |
| 6,591,549 B2 | 7/2003 | Weder | |
| 6,752,432 B1 | 6/2004 | Richardson | |
| D499,766 S | 12/2004 | Avilla et al. | |
| 6,835,437 B2 | 12/2004 | Goers et al. | |
| 6,866,439 B2 | 3/2005 | Steinschaden | |
| D507,119 S | 7/2005 | Reeves, Jr. | |
| 7,032,817 B2 | 4/2006 | Blank | |
| 7,078,604 B2 | 7/2006 | Rapaport | |
| 7,161,747 B2 | 1/2007 | Yang, Jr. | |
| 7,273,234 B1 | 9/2007 | Collins et al. | |
| D554,180 S | 10/2007 | Qvale | |
| 7,275,683 B2 | 10/2007 | Lazarowicz et al. | |
| D556,823 S | 12/2007 | Lombard | |
| 7,322,519 B2 | 1/2008 | Blank et al. | |
| D575,334 S | 8/2008 | Verhouden | |
| 7,549,244 B2 | 6/2009 | Nelms et al. | |
| 7,597,264 B2 | 10/2009 | Newbrough et al. | |
| 7,641,112 B2 | 1/2010 | Jensen et al. | |
| D613,793 S | 4/2010 | Winter | |
| D615,585 S | 5/2010 | Skinner et al. | |
| 7,707,758 B2 | 5/2010 | Stagg | |
| 7,717,335 B2 | 5/2010 | Halbur et al. | |
| 7,804,013 B2 | 9/2010 | Rapaport | |
| 7,825,315 B1 | 11/2010 | King | |
| D635,187 S | 3/2011 | Pompei et al. | |
| D636,134 S | 4/2011 | Spurgeon | |
| D655,755 S | 3/2012 | Sardo | |
| 8,152,058 B2 | 4/2012 | Halbur et al. | |
| 8,178,767 B1 | 5/2012 | King | |
| 8,227,675 B2 | 7/2012 | Koelzer | |
| 8,424,772 B1 | 4/2013 | Whitaker | |
| D681,453 S | 5/2013 | Glass et al. | |
| D703,749 S | 4/2014 | Pascale | |
| 2001/0042009 A1 | 11/2001 | Montague | |
| 2002/0027837 A1 | 3/2002 | Weber | |
| 2003/0035917 A1 * | 2/2003 | Hyman | B41M 1/30 |
| | | | 428/67 |
| 2004/0022991 A1 | 2/2004 | Higgins et al. | |
| 2004/0123715 A1 | 7/2004 | Stuckel et al. | |
| 2004/0237360 A1 | 12/2004 | Nelms et al. | |
| 2005/0155618 A1 | 7/2005 | Lafferty | |
| 2005/0174656 A1 | 8/2005 | Yang, Jr. | |
| 2006/0231609 A1 | 10/2006 | Lazarowicz et al. | |
| 2007/0057040 A1 | 3/2007 | Blank et al. | |
| 2007/0186747 A1 | 8/2007 | Angevine et al. | |
| 2011/0067550 A1 | 3/2011 | Koelzer | |

OTHER PUBLICATIONS

Related Design U.S. Appl. No. 29/448,769, filed Mar. 13, 2013.
Related Design U.S. Appl. No. 29/448,770, filed Mar. 13, 2013.
Related Design U.S. Appl. No. 29/448,771, filed Mar. 13, 2013.
International Search Report and Written Opinion for PCT Patent Application No. PCT/US14/24783 mailed on May 13, 2014.

* cited by examiner

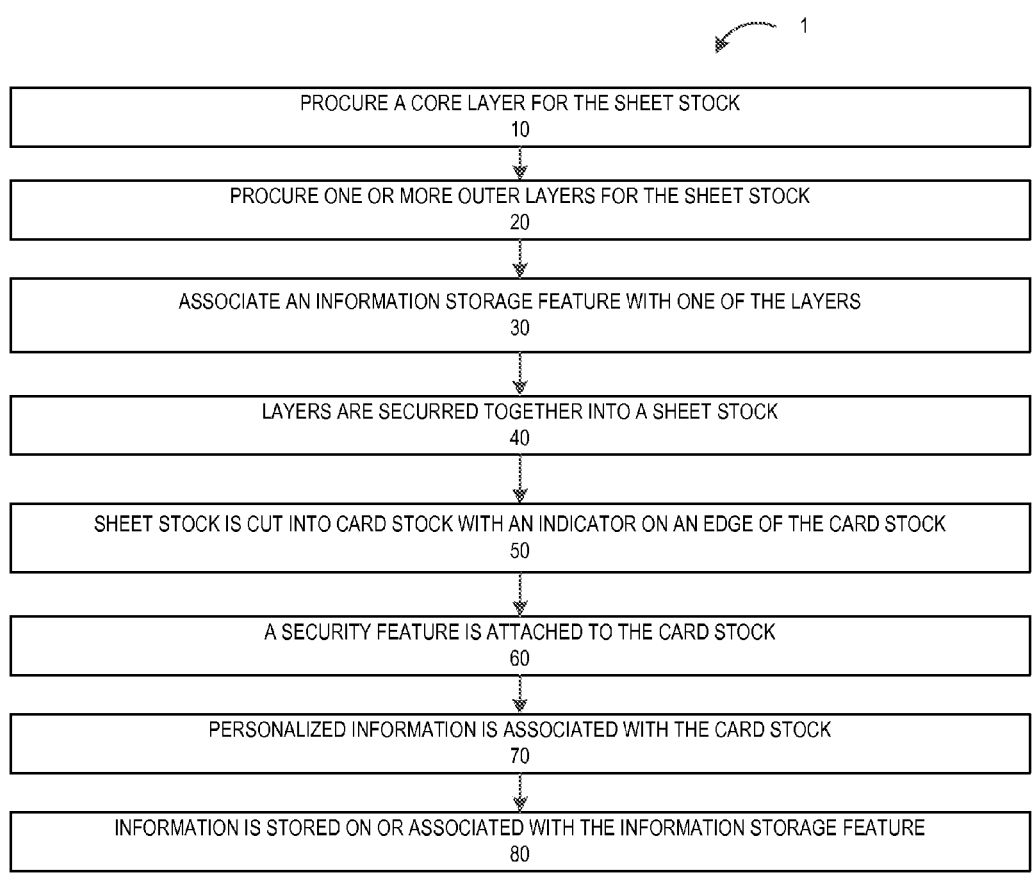

METHOD AND SYSTEM FOR MANUFACTURING A CARD WITH EDGE INDICATORS

BACKGROUND

Cards are used for different types of financial transactions, rewards, discounts, gifts, identification, insurance, security, and other like uses. Different types of cards may include credit cards, debit cards (e.g., automated teller machine cards), rewards cards, gift cards, identification cards (e.g., licenses, student identification cards, card badges, and the like), insurance cards (e.g., health insurance, dental insurance, and the like), security cards for entry into secure locations, and other like cards.

BRIEF SUMMARY

The embodiments provided herein are directed to methods and systems used to manufacture cards that comprise indicators on the edge of the card stock to help identify the cards. The tools (e.g., dies) used to create the card stock comprise tool projections formed as ridges, grooves, dimples, burrs, protrusions, or other like projections. The tool projections may extend from or into the edge of the tool. The projections on the dies are used to stamp out card stock having the desired indicators. The indicators on the card stock may be card projections on the edge of the card stock in the form of ridges, grooves, dimples, burrs, protrusions, or other like projections that provide at least a portion of the edge of the card stock with a textured surface. As such, the indicators may allow a person presenting the card or another person accepting the card (hereinafter "user(s)") to identify the card apart from other cards, for example either by sight or by touch. The card also has a first face (e.g., front face or back face) and a second face (e.g., back face or front face) (hereinafter "faces"). In some embodiments of the invention the card has a first side, a second side, a third side, and a fourth side, comprising a surface of the card extending around the sides of the card that forms an edge around the card. In other embodiments of the invention the card may have more or less sides, but the sides still form an edge around the sides of the card.

A user of the card may identify the card by viewing the indicator on the edge of the card. For example, a user may view projections on at least one edge of the card when the faces of the card cannot be viewed, or otherwise identified, such as for example when the card is located within a wallet or a purse. A user may also be able to identify the card by touching the indicator when the indicator cannot be seen. For example, a user may identify a card by touching the edge of the card and identifying the type of projections (i.e., ridge, groove, dimple, or the like), height of the projections, or the spacing of the projections on the edge of the card. The ability to identify the card simply through touch may be useful to visually impaired users for differentiating between types of cards that may otherwise be difficult to identify without the projections.

One embodiment of the invention comprises a system for creating card stock with an indicator. The system comprises a tool with a tool edge, tool projections over at least a portion of the tool edge, wherein the tool is configured to form card stock from sheet stock, and wherein the card stock comprises an indicator over at least a portion of an edge of the card stock formed by the tool projections.

In further accord with an embodiment of the invention, the system further comprises an extruder for procuring two or more layers for the sheet stock.

In another embodiment of the invention, the system further comprises two or more rollers, wherein the two or more rollers secure two or more layers into the sheet stock by laminating the two or more layers.

In still another embodiment of the invention, the system further comprises a heat press, wherein the heat press secures two or more layers into the sheet stock by laminating the two or more layers, wherein the heated press applies heat and pressure to the two or more layers.

In yet another embodiment of the invention, the sheet stock comprises a core layer formed from molded plastic, an outer layer representing a first face of the card stock, and an outer layer representing a second face of the card stock.

In further accord with an embodiment of the invention, the tool projections comprise a ridge, a groove, a dimple, a burr, or a protrusion on the tool edge of the tool.

In another embodiment of the invention, a distance between a peak of a first tool projection and a trough of the first tool projection is less than or equal to 0.003 inches.

In still another embodiment of the invention, the tool projections comprise at least a first tool projection and a second tool projection adjacent the first tool projection, and wherein a distance between a first tool projection peak and a second tool projection peak is less than or equal to 0.04 inches.

Another embodiment of the invention comprises a system for creating card stock with an indicator. The system comprises a tool with a tool edge, a plurality of tool projections over at least a portion of the tool edge, wherein a width distance between peaks of the plurality of tool projections that are adjacent is less than or equal to 0.04 inches, and wherein a height distance between the peaks of the plurality of tool projections and troughs of the plurality of tool projections is less than or equal to 0.003 inches. The tool is configured to form card stock from sheet stock, and wherein the card stock comprises an indicator over at least a portion of an edge of the card stock formed from the plurality of tool projections.

In further accord with an embodiment of the invention, the plurality of tool projections comprise a ridge, a groove, a dimple, a burr, or a protrusion on the tool edge of the tool.

In another embodiment of the invention, the plurality of tool projections project into or away from the tool edge of the tool.

Another embodiment of the invention comprises a method for creating card stock with an indicator. The method comprises forming card stock from sheet stock using a tool with a tool edge, wherein the tool edge comprises a tool projection over at least a portion of the tool edge, and wherein the card stock comprises an indicator over at least a portion of an edge of the card stock.

In further accord with an embodiment of the invention, the method further comprises procuring two or more layers for the sheet stock, and securing the two or more layers into the sheet stock.

In still another embodiment of the invention, securing the two or more layers into the sheet stock comprises laminating the two or more layers through the use of two or more rollers.

In yet another embodiment of the invention, securing the two or more layers into the sheet stock comprises laminating the two or more layers in a heated press that applies heat and pressure to the two or more layers.

In further accord with an embodiment of the invention, the sheet stock comprises a core layer formed molded plastic, an outer layer representing a first face of the card stock, and an outer layer representing a second face of the card stock.

In another embodiment of the invention, the tool projection comprises a ridge, a groove, a dimple, a burr, or a protrusion on the edge of the card stock.

In still another embodiment of the invention, a distance between a peak of a first tool projection and a trough of the second tool projection is less than or equal to 0.003 inches.

In yet another embodiment of the invention the tool projections comprises at least a first tool projection and a second tool projection adjacent the first tool projection, and wherein a distance between a first tool projection peak and a second tool projection peak is less than or equal to 0.04 inches.

In further accord with an embodiment of the invention, the method further comprises applying a signature panel to the back of the card stock, applying a hologram to the front of the card stock, personalizing the card stock with customer account information and a customer name, and wherein a financial institution card is created from the card stock.

To the accomplishment the foregoing and the related ends, the one or more embodiments comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 1 is a flowchart illustrating a method for producing card stock with an indicator, in accordance with an embodiment of the invention;

DETAILED DESCRIPTION

Figure 2A:
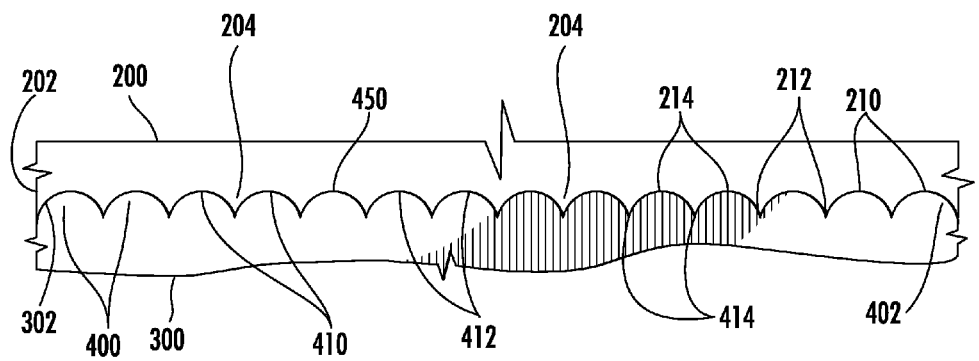
FIG. 2A is a plan view of an edge of a tool with tool projections and an edge of card stock with card projections, in accordance with an embodiment of the invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a flowchart for manufacturing a card with an indicator, in accordance with one embodiment of the invention. As illustrated by block 10 in FIG. 1, a core layer for the card is procured by purchasing or creating the core layer. In one embodiment of the invention, melted plastic is molded into a thin plastic sheet. For example, the core layer may be formed through an extrusion molding process. In other embodiments the core layer may be molded using other molding processes. Instead of molding the core layer from plastic, in some embodiments, the core layer may be formed from another material using another process. The core layer may be formed from a particular color, or otherwise, painted, printed on, or the like, to display a color or design (e.g., logo, word, or the like) that a customer desires on the card. In some embodiments of the invention there may be one or more core layers.

As illustrated by block 20, one or more outer layers are procured by purchasing or creating the one or more outer layers. In one embodiment the outer layers are also created from plastic, for example also through an extrusion process. In other embodiments, the outer layers may be created through other processes. The outer layers may be painted or printed (e.g., ink printed, laser printed, screen printed, or the like) with the color scheme and wording desired by the customer. In some embodiments, at least a portion of an outer layer is clear, and the color scheme of the card is created on the core layer, as previously described. In some embodiments, the core layer does not exist and only the outer layers are used to create the card (e.g., a front layer and back layer). In still other embodiments of the invention, there may be multiple outer layers on either side of the faces of the core layer.

In some embodiments, as illustrated by block 30 in FIG. 1, an information storage feature may be associated with the core layer or the one or more outer layers. The information storage feature may be a magnetic strip, barcode, radio frequency identifier (RFID) tag, optical storage device, smart card chip, or other like information storage feature. For example, one of the outer layers may be overlaid with a magnetic strip when the card is a financial institution card (e.g., credit card, debit card, gift card, or the like), an identification card, or a security card. In other examples, a bar code may be printed on the core layer or the outer layer. In still other examples, the RFID tag, optical storage device, or smart card chip may be affixed to the core layer or the outer layer. The process of associating the information storage feature to the card may be done before or after the core layer and/or the one or more outer layers are secured together.

As illustrated by block 40 in FIG. 1, the layers are secured together to form a sheet stock (e.g., sheet blank). In one embodiment of the invention, the layers may be laid on top of one another and placed into a press that may heat and apply pressure to the layers to form the sheet stock. In other embodiments of the invention, a roller system may be used to form the layers together. For example, outer layers on rolls may be laminated to a core layer using heat and pressure as the outer layers are applied to the core layer. In some embodiments the layers may include a core layer, a front outer layer, and a back outer layer. In other embodiments of the invention the layers may only include a front layer and a back layer (or core layer). In still other embodiments, there may be multiple front layers and back layers. The present invention covers any number of different layers that are formed together to create the sheet stock.

Block 50 of FIG. 1 illustrates that the sheet stock is cut into card stock (e.g., one or more card blanks), with the indicator on the edge of the card stock. In some embodiments of the invention the sheet stock is cut or stamped using one or more tools, such as dies, that form the card stock with the indicators on at least a portion of the edge of the card stock. The dies used to form the card stock may be plates or other like tools that have an outer die edge with the same projections and dimensions as described below with respect to the card stock. In this way a die may be a mirror image of the card stock and be used to punch or cut out card stock with the same type of projections and projection dimensions as described herein with respect to the card stock. In other embodiments of the invention, the dies used to form the card stock may have a cavity (e.g., die cavity) with an inner die edge having the opposite projections and dimensions as described herein with respect to the card stock. In this way a die may have the opposing image of the card stock and be used to punch or cut out the card stock with the desired type of projections and projection dimensions as described herein with respect to the card stock (e.g., see FIGS. 2A, 2B, and 3). In still other embodiments the dies may be one or more blades (e.g., die blades) that punch or cut one or more of the edges of the card stock as described herein. In still other embodiments of the invention the dies may be cooperating dies that work together to form the card stock with the desired edge indicators. For example, in one embodiment a die punch with die punch projections having the mirror image of the desired card stock may work in connection with a die cavity with die cavity projections that are opposite the die punch projections and desired card projections, such that the die punch and die cavity stamp out the card stock with the desired card projections. Regardless of the type of dies used to form the card stock, the dies used in the present invention are configured to punch or stamp the card stock with edge indicators, as described herein. In other embodiments of the invention the sheet stock may be cut using other types of cutting devices.

As illustrated in block 60 of FIG. 1, at least one security feature may be attached to the card stock, if necessary. The security features may include a signature strip, hologram, photo, security tape, or other like security feature. In some embodiments one or more of these security features may be incorporated into the core layer or one or more outer layers of the card before or after various steps within the card manufacturing process described herein.

The manufacturer may store the card stock until the card stock is ready for personalization, the card stock may be shipped to the institution that ultimately provides the card to the customer, or the card stock may be sent to another party for additional manufacturing. In some embodiments, the card stock is ready for use by an institution after the card stock is cut from the sheet stock. For example, in the case of reward cards or gift cards, the card stock may be shipped to a store, at which the store may ultimately associate the card with a customer or dollar amount. In an example where the card is an identification card, the card stock may be sent to a secure agency that associates the card with a person, for example prints or affixes a photo on the card stock, and/or stores data on the information storage feature (e.g., magnetic strip or RFID tag). In other embodiments of the invention, for example, in the case of financial institution cards, the card stock is sent to a secure location for additional processing of the card with personalized financial information.

As illustrated by block 70 in FIG. 1, personalized information may be associated with the card stock. As previously discussed this may include printing photo identification onto the card, with respect to an identification card or security card. In other embodiments of the invention, the personalized information may be an account number or customer name that is printed, stamped, embossed, or otherwise attached to or formed into the card. For example, with respect to financial institution cards (e.g., credit card, debit card, and the like) a customer name, account number, and expiration date may be embossed into the card stock to form the card.

Block 80 of FIG. 1 illustrates that information may also be stored on or associated with the information storage feature of the card stock. For example, with respect to financial institution cards, account information, customer information, financial institution communication information (e.g., where to route requests for purchases), or other like information may be stored on a magnetic strip of the card. In other embodiments, for example with respect to gift cards, prepaid cards, or the like, the dollar amount of the card may be stored on the magnetic strip of the card. In still other embodiments of the invention, for example with respect to security cards or identification cards, the magnetic strip may hold information about security clearance, personal identification information about the card holder, communication information to allow access to a database that contains information, access information to allow access to a secure location, or other like information. In other embodiments, the information stored may be stored on information storage features other than a magnetic strip, as previously discussed. With respect to reward cards, the information storage feature may be a bar code that is associated with a particular customer in a database in order to provide rewards to the customer based on the customer's purchases or the customer's profile. Embodiments of the present invention may create cards with indicators, on which various types of information may be stored or associated with the information storage feature of the card.

FIG. 2A illustrates one embodiment of a plan view of the edge of a tool (e.g., die) used to create a card indicator 400 (e.g., projections 402) on an edge of a card, in accordance with an embodiment of the invention. As illustrated in FIG. 2A, the tool 200 (e.g., die) has a tool edge 202 (e.g., die edge) with tool projections 204, such as a plurality of inverted half circles 210 with tool peaks 212 and tool troughs 214 that are used to form the card indicator 400 on the card edge 302 of the card stock 300. The tool edge 202 is similar to a sawtooth, serrated knife, triangular point, or other like edge that forms the half circle projections 410 on the card edge 302. In some embodiments of the invention, the half circle projections 410 have projection peaks 412 and projection troughs 414. The projection peaks 412 may have rounded ends in some embodiments (as illustrated in FIG. 2A). The projection troughs 414 may have pointed troughs in some embodiments (as illustrated in FIG. 2A).

Figure 2B:
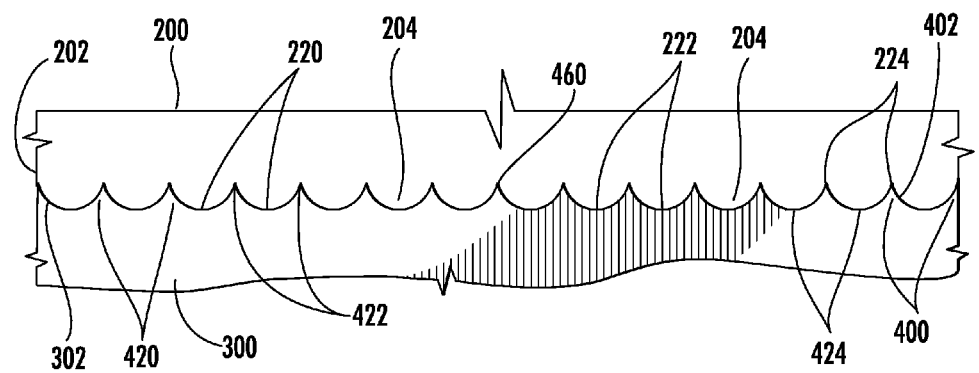
FIG. 2B is a plan view of an edge of a tool with tool projections and an edge of card stock with card projections, in accordance with an embodiment of the invention.

In some embodiments of the invention the tool edge 202 and card edge 302 described with respect to FIG. 2A are reversed, as illustrated in FIG. 2B. As such, the tool 200 (e.g., die) has a tool edge 202 with tool projections 204, such as a plurality of half circles 220 projecting from the tool 200 with tool peaks 222 and tool troughs 224 that are used to form the card indicator 400 (e.g., projections 402) on the card edge 302 of the card 300. The tool edge 202 is used to form the sawtooth projections 420 on the card edge 302. The tool edge 202 in FIG. 2B is similar to a half-circle edge, or other like edge that forms the sawtooth projections 420 on the card edge 302. In this embodiment the sawtooth projections 420 have projection peaks 422 and projection troughs 424. The projection peaks 422 of the card edge 302 are illustrated as having a point, while the projection troughs 424 are substantially half circles.

Figure 3:
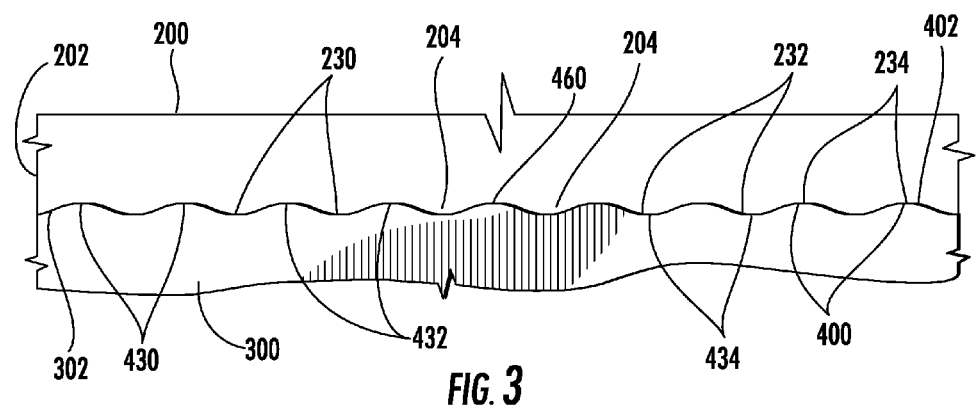
FIG. 3 is a plan view of an edge of a tool with tool projections and an edge of card stock with card projections, in accordance with an embodiment of the invention.

In some embodiment of the invention, as illustrated in FIG. 3, the tool 200 (e.g., die) has a tool edge 202 with tool projections 204, such as rounded features 230 projecting from the tool 200, with rounded tool peaks 232 and rounded tool troughs 234 that are used to form the card indicator 400 on the card edge 302 of the card 300. The tool edge 202 is used to form the rounded projections 430 on the card edge 302. In this embodiment the rounded projections 430 have projection peaks 432 and projection troughs 434 that are both rounded for forming a card edge 302 that is in the shape of a sine wave, such that the projection peaks 432 and projection troughs 434 have the same or similar dimensions.

In other embodiments of the invention, the tool peaks and tool troughs may have other shapes not explicitly described herein that produce projection peaks and projection troughs in the card edge 302 that are not explicitly described herein.

Regardless of the various configurations of the tool edge 202, the tool 200 is configured cut sheet stock into card stock 300. The tool 200 cuts sheet stock such that the card edge 302 of the card stock 300 has a projection 402 over at least a portion of the card edge 302.

Figure 4:
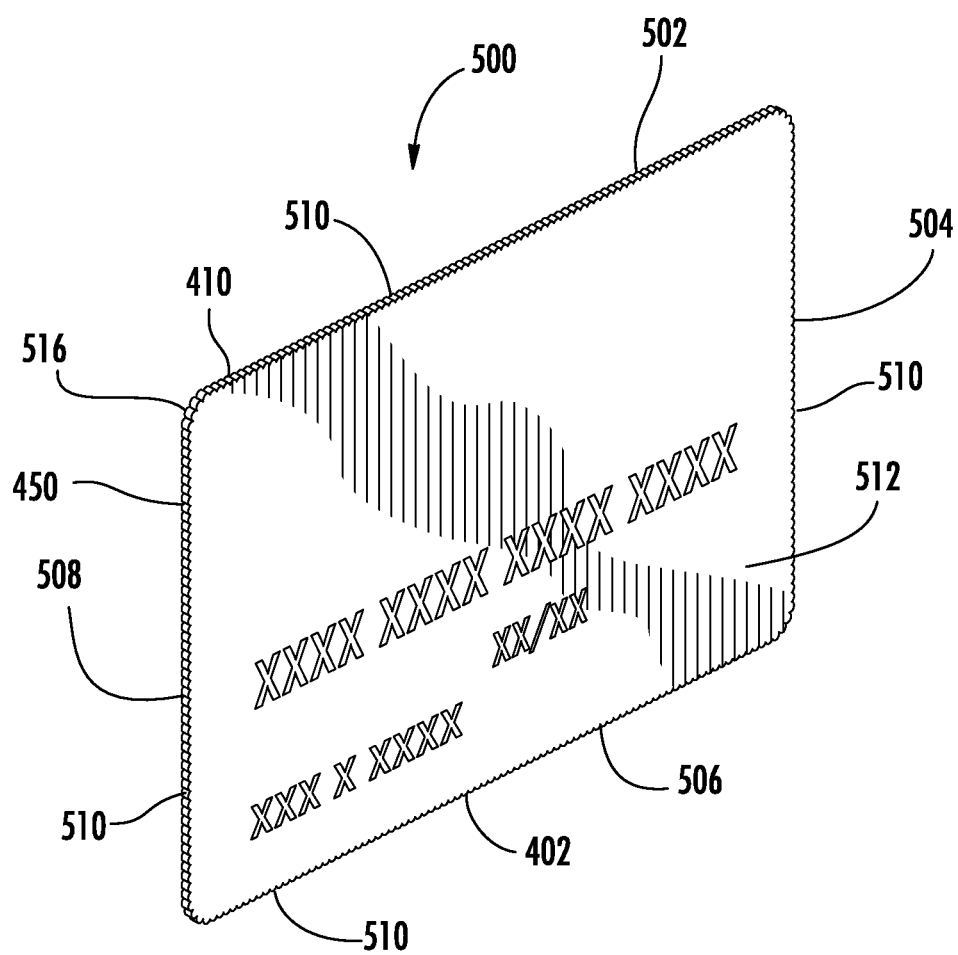
FIG. 4 is a perspective view of a card with an indicator on the edge of the card, in accordance with an embodiment of the invention.

FIG. 4 illustrates a perspective view of a financial card 500, such as a debit card or credit card, made from card stock 300. In the illustrated embodiment the financial card 500 has a first side 502, a second side 504, a third side 506, and a fourth side 508, comprising a surface of the card extending around the outside of the card forming the edge 510 of the card. As previously discussed the edge 510 of the financial card 500 has a card indicator 400 that is formed on the card stock. As illustrated in FIG. 4, the card indicator 400 may be located around the entire edge 510 of the card. In the illustrated embodiment, the card indicator 400 comprises projections 410 that are semi-circular (e.g., half-circle) projections 410. However, as previously discussed and outlined in further detail later the projections 402 may be simi-circular, pointed, rounded, or have another type of shape.

Figure 5:
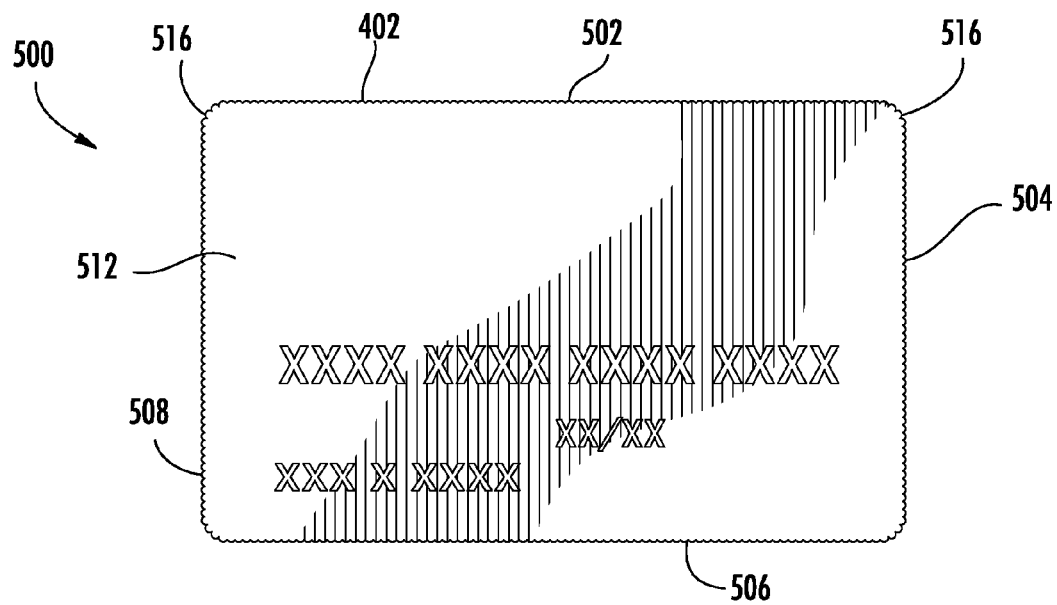
FIG. 5 is a first face view of a card with an indicator on the edge of the card, in accordance with an embodiment of the invention.

FIG. 5 illustrates one embodiment of the first face 512 of the financial card 500. In the illustrated embodiment, the first face 512 of the financial card 500 is the front face. The front face has an institution name and/or logo, an embossing of the card owner's account number and name, as well as the card's expiration date. In other embodiments of the invention the first face 512 may be the back face of the card. The first face 512 of the card may have different types of writing, logos, pictures, or the like depending on the intended use of the card.

Figure 6:
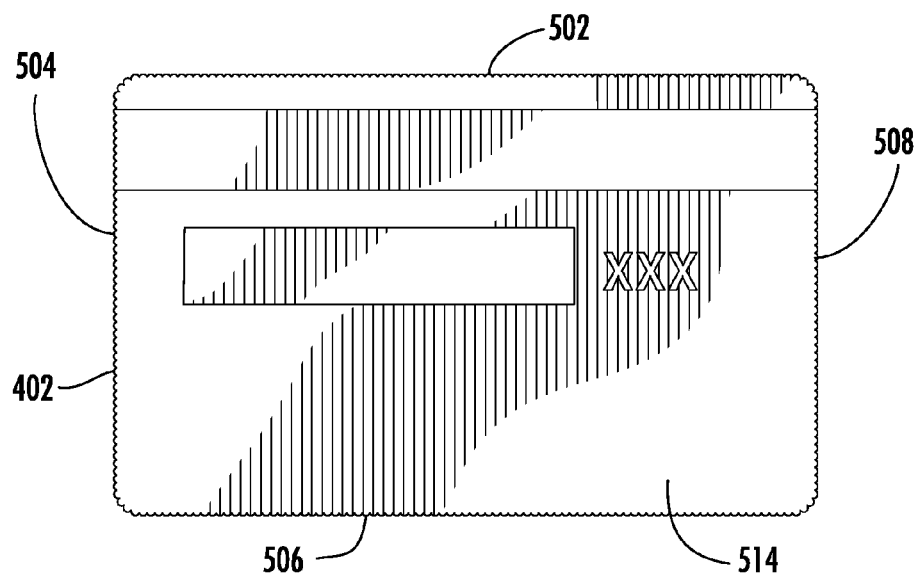
FIG. 6 is a second face view of a card with an indicator on the edge of the card, in accordance with an embodiment of the invention.

FIG. 6 illustrates one embodiment of the second face 514 of the financial card 500. In the illustrated embodiment, the second face 514 of the financial card 500 is the back face. The back face has a magnetic strip, a signature block, a security code, and other potential features. In other embodiments of the invention the second face 514 may be the front face of the card. The second face 512 of the card may have different types of writing, logos, pictures, or the like depending on the intended use of the card.

Figure 7:
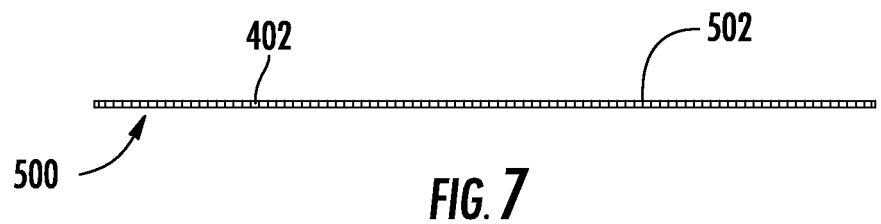
FIG. 7 is a first side view of a card with an indicator on the edge of the card, in accordance with an embodiment of the invention.

FIG. 7 illustrates one embodiment of the first side 502 of the financial card 500 with the semi-circular projections 410. In the illustrated embodiment the first side 502 is the top edge of the financial card 500, however, in other embodiments of the invention the first side 502 may be another side of the financial card 500.

Figure 8:
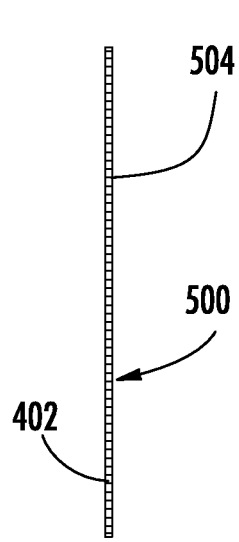
FIG. 8 is a second side view of a card with an indicator on the edge of the card, in accordance with an embodiment of the invention.

FIG. 8 illustrates one embodiment of the second side 504 of the financial card 500 with the semi-circular projections 410. In the illustrated embodiment the second side 504 is the right edge of the financial card 500, however, in other embodiments of the invention the second side 504 may be another side of the financial card 500.

Figure 9:
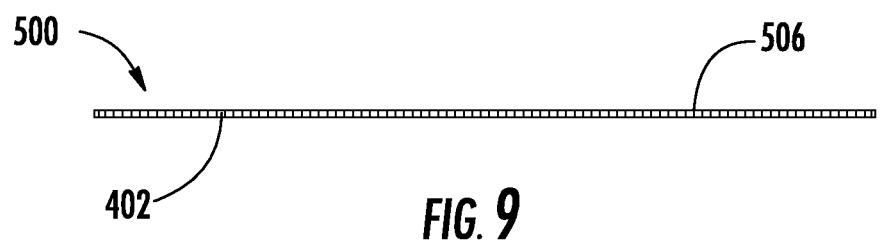
FIG. 9 is a third side view of a card with an indicator on the edge of the card, in accordance with an embodiment of the invention.

FIG. 9 embodiment of the third side 504 of the financial card 500 with the semi-circular projections 410. In the illustrated embodiment the third side 506 is the bottom edge of the financial card 500, however, in other embodiments of the invention the third side 506 may be another side of the financial card 500.

Figure 10:
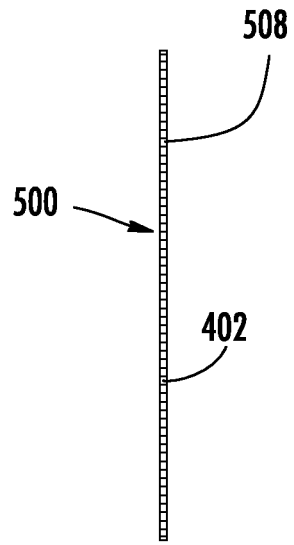
FIG. 10 is a fourth side view of a card with an indicator on the edge of the card, in accordance with an embodiment of the invention.

FIG. 10 illustrates one embodiment of the fourth side 508 of the financial card 500 with the semi-circular projections 410. In the illustrated embodiment the fourth side 508 is the left edge of the financial card 500, however, in other embodiments of the invention the fourth side 508 may be another side of the financial card 500.

In other embodiments of the invention, instead of the semi-circular projections 410 illustrated with respect to FIGS. 4-10, the financial card 500 (or other type of card) may have projections 402 of different shapes, such as the rounded projections 430 illustrated in FIGS. 18-24. As illustrated in FIGS. 18-24, and as previously described with respect to FIG. 3 the edges on the sides 502, 504, 506, 508 of the card 500 may have rounded projections 430 that create a card edge 302 that has the shape of a sine wave.

Figure 11A:
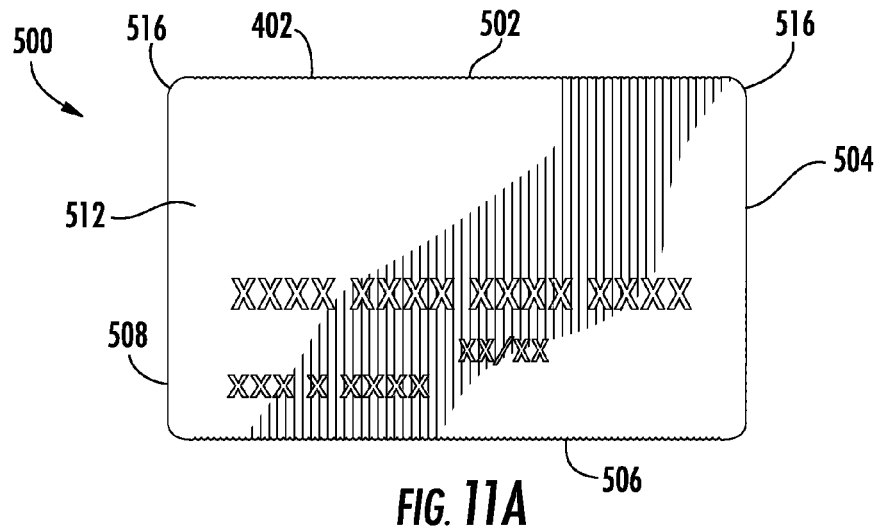
FIG. 11A illustrates a plan view of a card with an indicator on a portion of the edge of the card, in accordance with an embodiment of the invention.
Figure 11B:
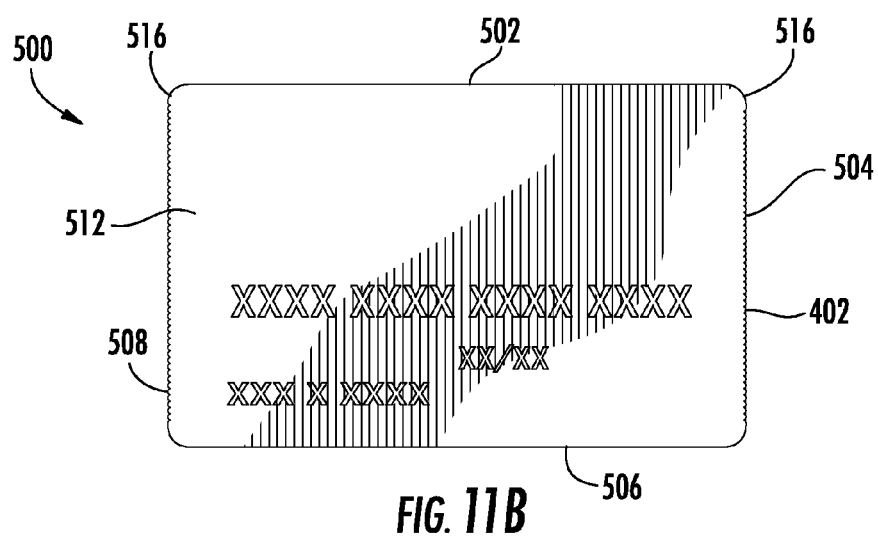
FIG. 11B illustrates a plan view of a card with an indicator on a portion of the edge of the card, in accordance with an embodiment of the invention.
Figure 11C:
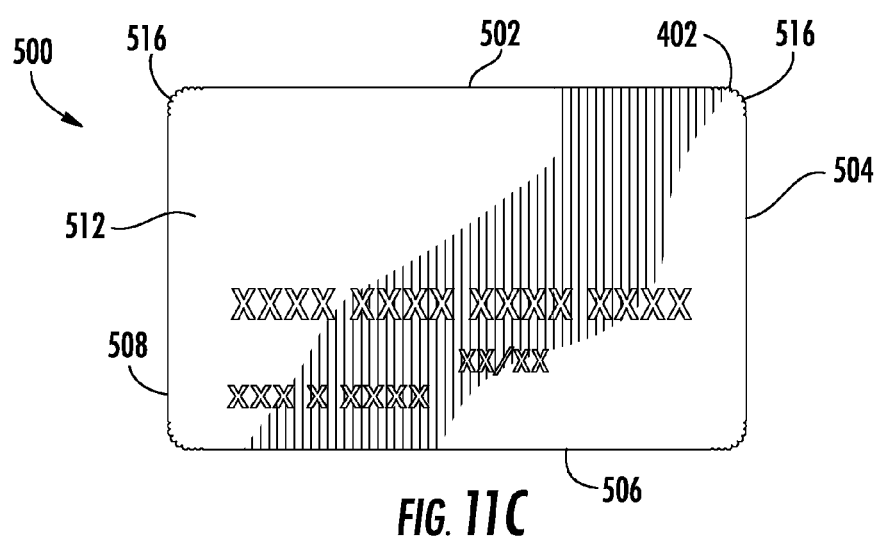
FIG. 11C illustrates a plan view of a card with an indicator on a portion of the edge of the card, in accordance with an embodiment of the invention.

In the present invention, the card indicator 400, for example the projections 402 on the card edge 302 of the card stock 300, may be located over the entire card edge 302 of the card stock 300 or along only a portion of the card edge 302 of the card stock 300. Along with the different types of projections 402, the location of the projections 402 on the card edge 302 may allow a user to differentiate one type of card from another type of card. In order to create the different types of projections 402 along different portions of the card edge 302 of the card stock 300, the tool edge 202 of the tool 200 is configured with tool projections 204 (e.g., projections on the cutting or punching edge of the tool) that are used to create the desired type of card edge 302 on the card stock 300. Therefore, in some embodiments of the invention the tool projections 204 are formed around substantially the entire tool edge 202 of the tool 200, such that the card stock 300 ultimately formed from the sheet stock comprises a card indicator 400 around the entire card edge 302, as is illustrated in FIGS. 5-10 and 18-24. In other embodiments of the invention, the tool projection 204 is formed on only one or more sides or corners of the tool 200, such that the card stock 300 ultimately formed from the sheet stock comprises a card indicator 400 on one or more of the sides or corners of the card stock 300, as illustrated in FIGS. 11A (e.g., projections 402 on the first side 502 and third side 506), 11B (e.g., projections 402 on the second side 504 and fourth side 408), and 11C (e.g., projections 402 on the corners 516). In some embodiments the tool projection may be located along the entire length, or along only a portion of the length, of the one or more sides or corners of the tool 200, such that the card stock 300 ultimately formed from the sheet stock comprises a card indicator 400 on a portion, or the entire length, of the sides or corners of the card stock 300.

Figure 12:
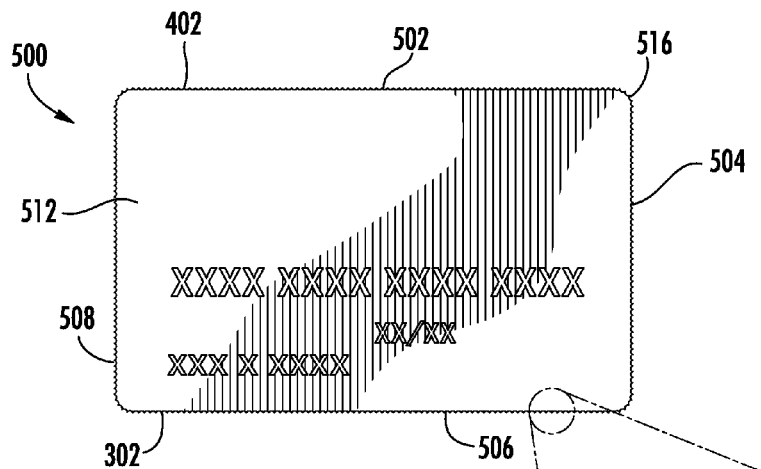
FIG. 12 illustrates a plan view and a magnified view of a card illustrating the spacing of an indicator, in accordance with an embodiment of the invention.
Figure 13:
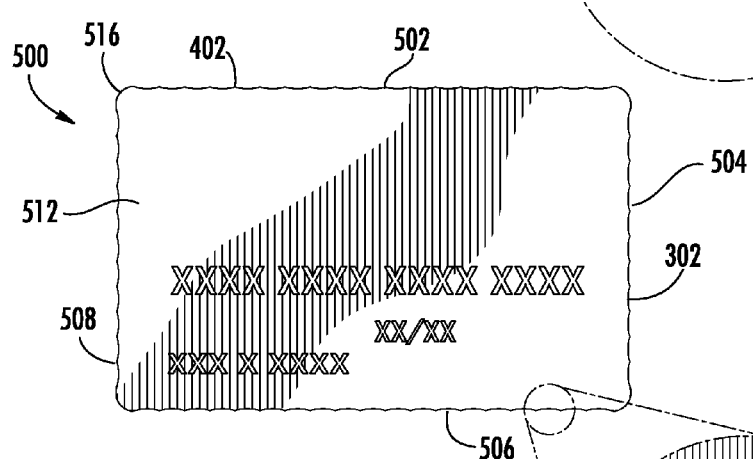
FIG. 13 illustrates a plan view and a magnified view of a card illustrating the spacing of an indicator, in accordance with an embodiment of the invention.

FIGS. 12 and 13 illustrate two embodiments of the card, wherein the projections 402 are spaced apart at different intervals along at least a portion of the card edge 302. The reference letter H illustrates the height of the projections 402 from the peak of the projections 402 to the trough of the projections 402. The reference letter W illustrates the width of the projections 402 from a first peak of a projection 402, to a second peak of a projection 402 adjacent the first peak. In some embodiments of the invention the peak of the projections 402 will not extend greater than 0.003" H above the trough of the projections 402. However, in some embodiments of the invention the difference may be less than or equal to 0.005", less than or equal to 0.010", less than or equal to 0.020", less than or equal to 0.03", less than or equal to 0.04", less than or equal to 0.05", less than or equal to 0.1" or the like, or otherwise, be between two or more of these distances, or outside of these distances.

The projections 402 may also be spaced apart a number of different distances. In one embodiment of the invention, a first projection peak 522 may be located adjacent a second projection peak 524 located at a distance W of approximately 0.003". The distance W between a first peak 522 and a second peak 524, in other embodiments may be approximately 0.037", as illustrated in FIG. 12. The distance W between a first peak 522 and a second peak 524, in other embodiments may be approximately 0.16", as illustrated in FIG. 13. In still other embodiments of the invention, the distance W between a first peak 522 and a second peak 524 may be between 0.003" to 0.037", less than or equal to 0.005", less than or equal to 0.010", less than or equal to 0.020", less than or equal to 0.030", less than or equal to 0.040", less than or equal to 0.050", less than or equal to 0.1", less than or equal to 0.2", or the like, or otherwise, be between two or more of these distances, or outside of these distances. The differences in the distances H and W described with respect to FIGS. 12 and 13, apply equally to the projections 402 that are illustrated in the other figures herein. Therefore, in some embodiments of the invention the distances described with respect to the projections 402 above may apply to the projections 402 illustrated in FIGS. 2-11C, and 14-24, as well as other types of projections 402 not specifically described herein.

Furthermore, the dimensions described above with respect to the card projections 402 on the card stock 300, may apply to the tool projections 204 on the tool 200 that are used to create the card projections 402 on the card stock 300.

Figure 14:
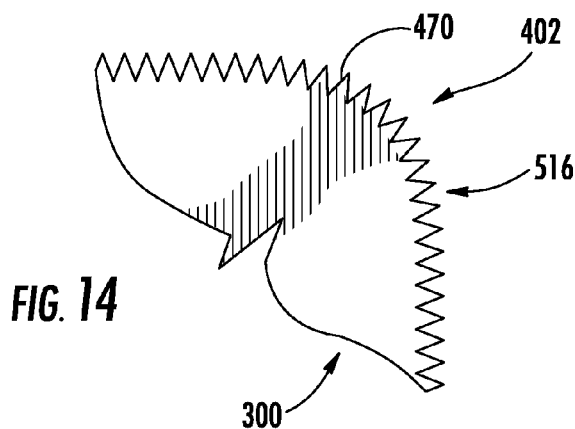
FIG. 14 illustrates a view of a portion of a card with an indicator, in accordance with an embodiment of the invention.

FIG. 14 illustrates another embodiment of the invention, wherein the projections 402 are v-shaped projections 470 on at least a portion of the edge 302 of card stock 300. In the embodiment illustrated in FIG. 14 the v-shaped projections 470 are located on the corner 516 of the card stock 300, and/or along two perpendicular sides of the card stock 300. In other embodiments of the invention, the v-shaped projections 470 may be located along a portion of one or more sides of the cards (e.g., a first side 502, a second side 504, a third side 506, or a fourth side 508).

Figure 15:
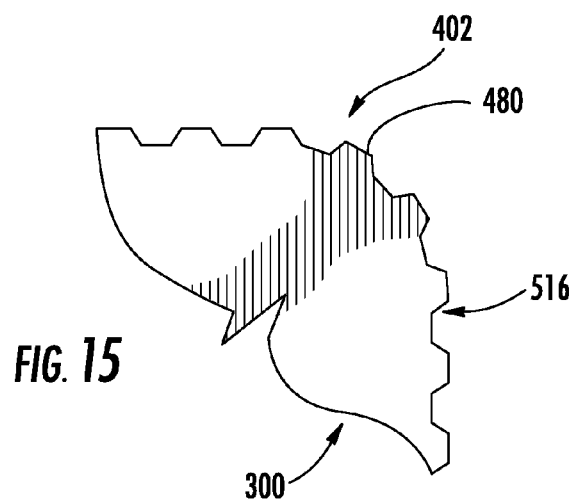
FIG. 15 illustrates a view of a portion of a card with an indicator, in accordance with an embodiment of the invention.

FIG. 15 illustrates another embodiment of the invention, wherein the projections 402 are trapezoidal projections 480 on at least a portion of the edge 302 of card stock 300. In the embodiment illustrated in FIG. 15 the trapezoidal projections 480 are located on the corner 516 of the card stock 300, and/or along the perpendicular sides of the card stock 300. In other embodiments of the invention, the trapezoidal projections 480 may be located along a portion of one or more sides of the cards (e.g., a first side 502, a second side 504, a third side 506, or a fourth side 508).

Figure 16:
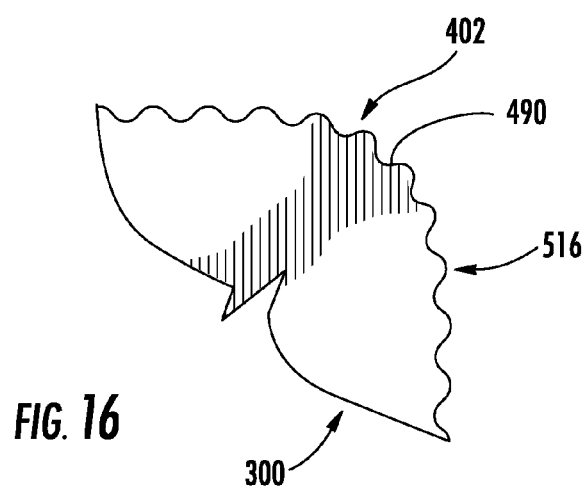
FIG. 16 illustrates a view of a portion of a card with an indicator, in accordance with an embodiment of the invention.

FIG. 16 illustrates another embodiment of the invention, wherein the projections 402 are sine wave projections 490 in the shape of a sine curve. In the embodiment illustrated in FIG. 16 the sine wave projections 490 are located on the corner 516 of the card stock 300, and/or along two perpendicular sides of the card stock 300. In other embodiments of the invention, the sine wave projections 490 may be located along a portion of one or more sides of the cards (e.g., a first side 502, a second side 504, a third side 506, or a fourth side 508). The sine wave projections 490 are further illustrated in FIGS. 18-24.

In still other embodiments of the invention the projections 402 may be of any type of shape and size. Furthermore, the projections 402 may either project from a surface of the edge 302 of the card stock 300, or project into the edge 302 of the surface of the card stock 300. The projections 402 (or the reverse image of the projections 402) illustrated and described with respect to FIGS. 14-16, may also illustrate and describe the tool projections 204 (or the reverse image of the tool projections 204) that are used to create the card edges 302 of the card stock 300.

Figure 17:
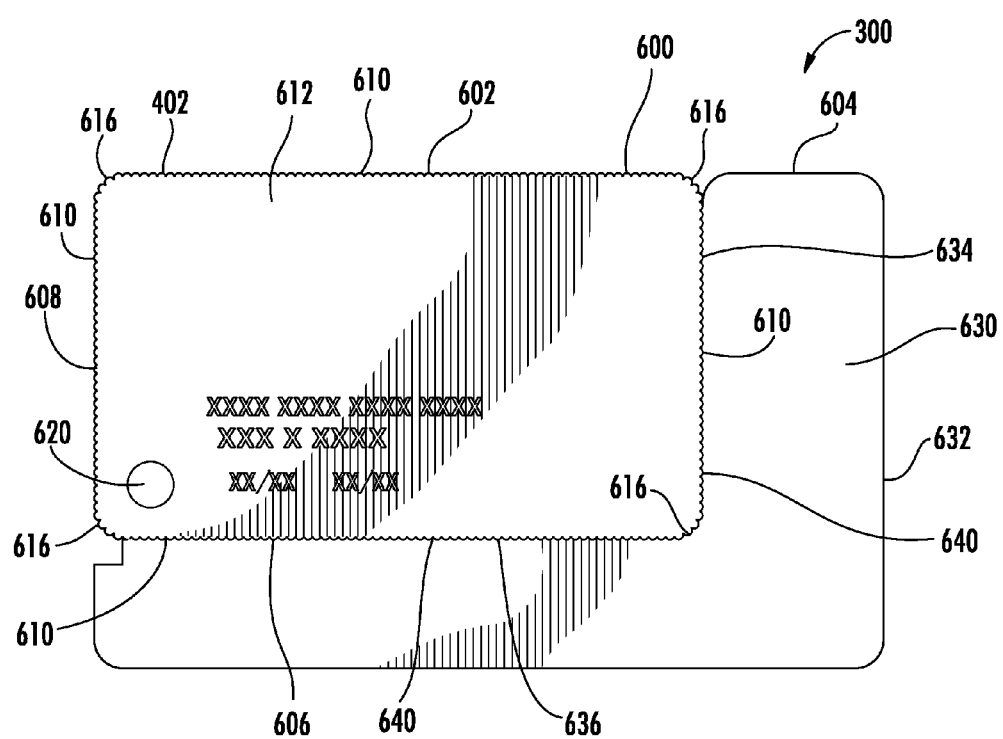
FIG. 17 illustrates a plan view of a card with an indicator on a portion of the edge of the card, in accordance with an embodiment of the invention.
Figure 18:
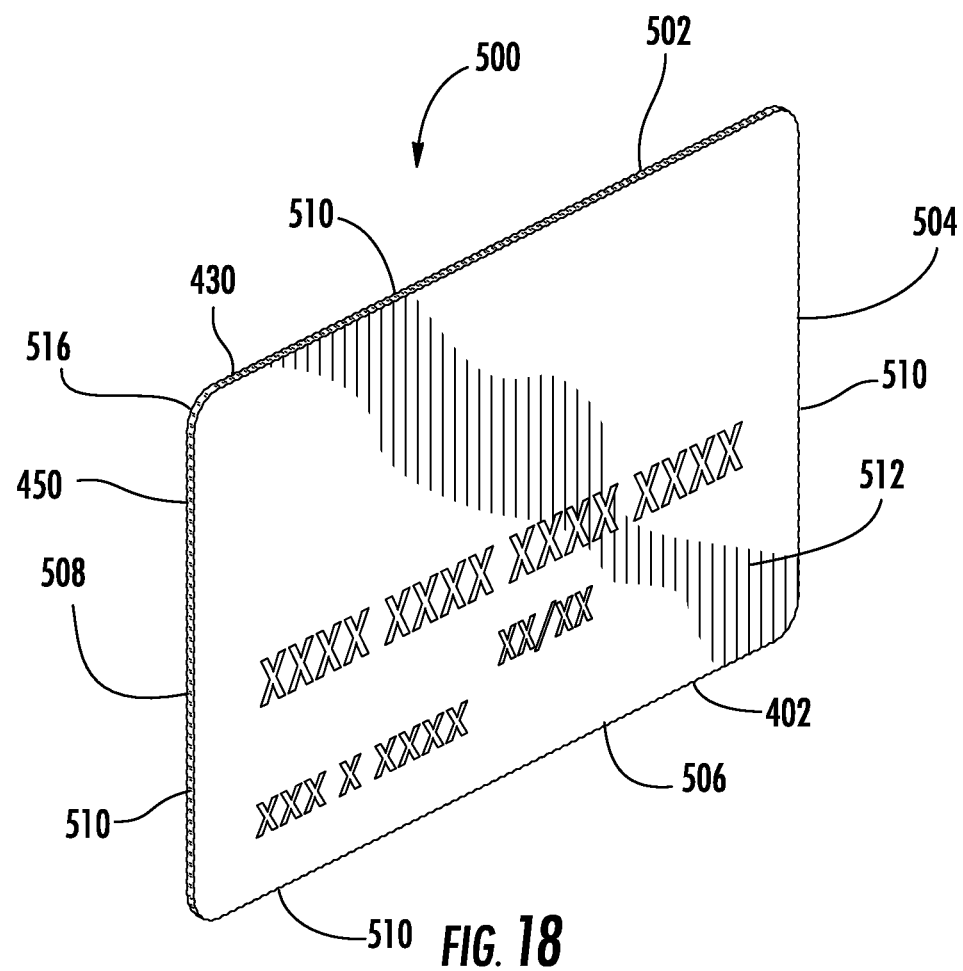
FIG. 18 is a perspective view of a card with an indicator on the edge of the card, in accordance with an embodiment of the invention.
Figure 19:
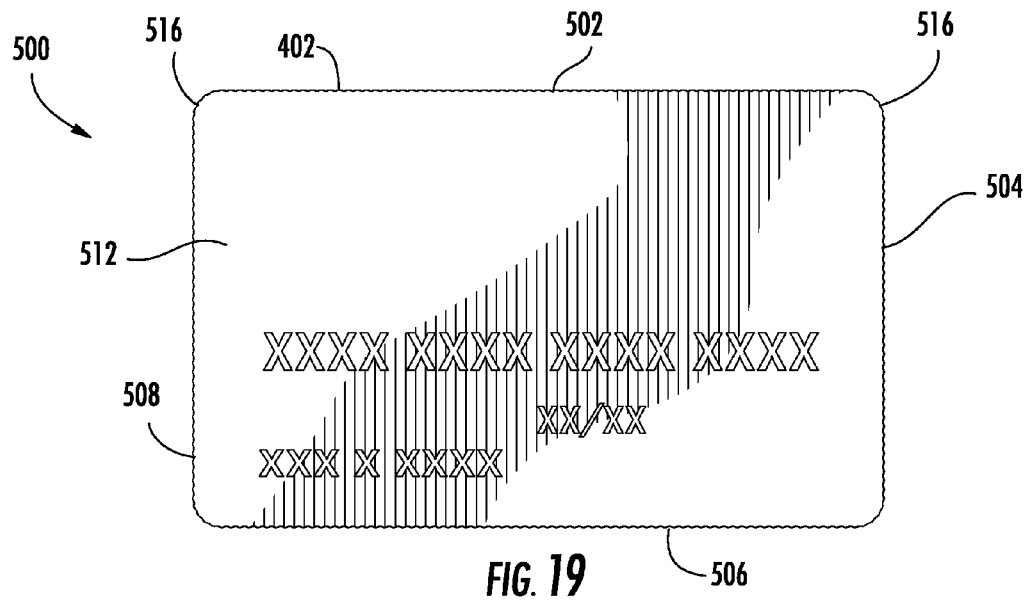
FIG. 19 is a first face view of a card with an indicator on the edge of the card, in accordance with an embodiment of the invention.
Figure 20:
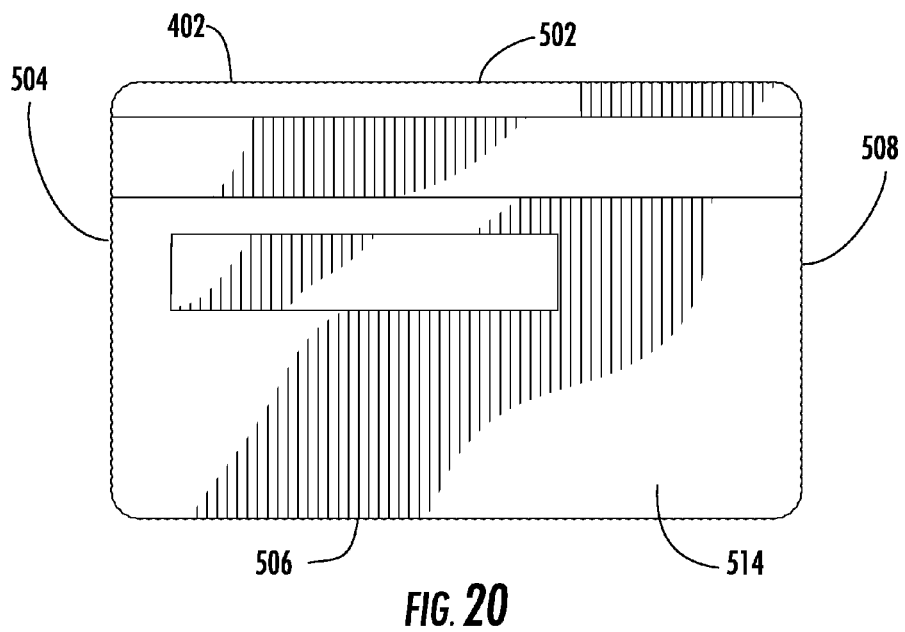
FIG. 20 is a second face view of a card with an indicator on the edge of the card, in accordance with an embodiment of the invention.
Figure 21:
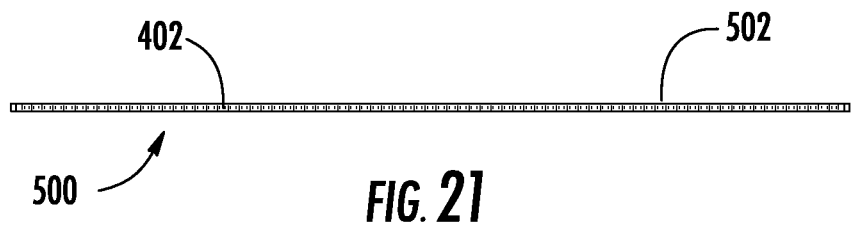
FIG. 21 is a first side view of a card with an indicator on the edge of the card, in accordance with an embodiment of the invention.
Figure 23:
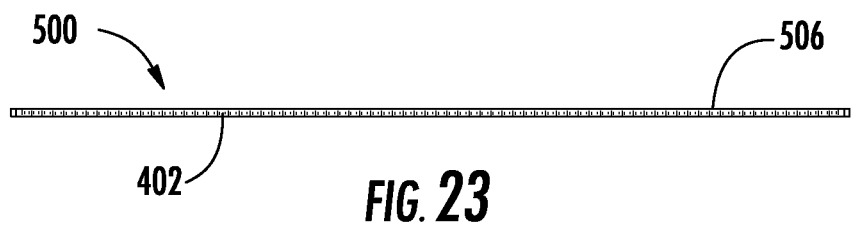
FIG. 23 is a third side view of a card with an indicator on the edge of the card, in accordance with an embodiment of the invention.
Figures 22, 24:
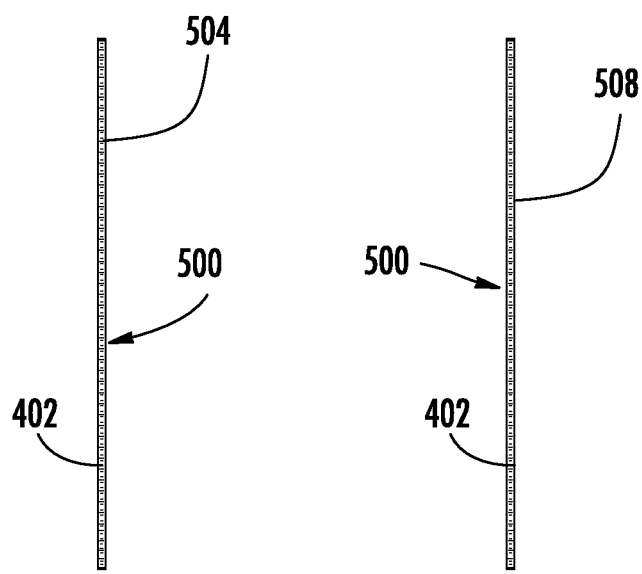
FIG. 22 is a second side view of a card with an indicator on the edge of the card, in accordance with an embodiment of the invention.
FIG. 24 is a fourth side view of a card with an indicator on the edge of the card, in accordance with an embodiment of the invention.

FIG. 17 illustrates another embodiment of the invention wherein the card is a mini-card 600, which is configured with an aperture 620 therethrough in order to allow for attachment to a key-ring. In some embodiments of the invention, the mini-card 600 is configured with projections 402 around at least a portion of the mini-card 600 in the card stock 300. In some embodiments of the invention the mini-card 600 has a first side 602, a second side 604, a third side 606, a fourth side 608, and corners 616, comprising a mini-card edge 610, a first face 612, and a second face (not illustrated). In some embodiments the mini-card 600 is configured to snap out of shell 630 such that one or more sides of the mini-card 600 may be attached to the shell 630 along a perforated edge 640. The mini-card 600 may be popped out of the shell 630 by breaking the perforated edge 640.

In some embodiments of the invention the mini-card may have projections 402 along portions of one or more of the first side 602, second side 604, third side 606, or fourth side 608. As illustrated in FIG. 17 the first side 602 is the top side, the second side 604 is the right side, the third side 606 is the bottom side, and the fourth side 608 is the left side of the mini-card 600. One or more of the corners 616 may or may not have the projections 402. In some embodiments, the projections 402 may be on the second side 604 and third side 606, and may be secured to the perforated edge 640 of the shell 630. The mini-card 600 may be separated from the shell 630 for use. In other embodiments, the projections 402 may not be located on the perforated edge 640 between the shell 630 and one or more of the second side 604 and third side 606. The shell 630 may have an outer edge 632 that may or may not have projections 402, while the inner edge 634 of the shell 630 also may or may not have projections 402 based on whether or not the side of the mini-card 600 to which the shell 630 is connected has projections 402. The tool 200 used to create the mini-card 600 would have the tool projections 204 that form the card projections 402 on the one or more surfaces of the mini-card 600.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for creating card stock with an indicator, comprising:
    a tool with a tool edge, the tool edge comprising a top tool edge, a bottom tool edge, a right tool edge, and left tool edge, and four rounded corners each located between two of the tool edges;
    tool projections over at least a portion of the top tool edge and at one of the rounded corners adjacent the top tool edge, the tool projections comprising peaks and troughs, wherein the projections are saw-tooth projections or rounded projections, and wherein the tool projections are uniform;
    wherein the tool projections have a width that is less than or equal to 0.05 inches;
    wherein the tool projections have a height that is less than or equal to 0.005 inches;
    wherein the tool is configured to form card stock from sheet stock;
    wherein the card stock comprises an indicator over at least a portion of an edge of the card stock formed by the tool projections;
    wherein the card stock formed from the tool comprises:
        a first face;
        a second face opposite the first face;
        a card edge around the card stock between the first face and the second face, wherein the card edge comprises a top card edge, a bottom card edge, a right card edge, and a left card edge, and four rounded corners each located between two of the card edges;
        an indicator on at least a portion of the top card edge and at one of the rounded card corners adjacent the top card edge, wherein the indicator comprises a plurality of card projections comprising peaks and troughs, wherein the plurality of card projections are rounded uniform projections formed from the saw-tooth tool projections or rounded tool projections;
        wherein the plurality of card projections have a width that is less than or equal to 0.05 inches; and
        wherein the plurality of card projections have a height that is less than or equal to 0.005 inches.

2. The system of claim 1, further comprising:
    an extruder for procuring two or more layers for the sheet stock.

3. The system of claim 1, further comprising:
    two or more rollers, wherein the two or more rollers secure two or more layers into the sheet stock by laminating the two or more layers.

4. The system of claim 1, further comprising:
    a heat press, wherein the heat press secures two or more layers into the sheet stock by laminating the two or more layers, wherein the heated press applies heat and pressure to the two or more layers.

5. The system of claim 1, wherein the sheet stock comprises:
    a core layer formed from molded plastic;
    an outer layer representing a first face of the card stock; and
    an outer layer representing a second face of the card stock.

6. The system of claim 1, wherein the card stock is configured for use in financial transaction machines with the plurality of projections on at least the portion of the top card edge and at one of the rounded card corners; and wherein the indicator is configured for being seen or touched when the card stock is inserted into a wallet exposing the top card edge or inserted into a wallet exposing one of the rounded card corners adjacent the top edge.

7. The system of claim 1, wherein the tool projections, and the card projections formed therefrom, have the height that ranges from 0.001 to 0.005; and wherein the tool projections, and the card projections formed therefrom, have the width that ranges from 0.010 to 0.05 inches, inclusive.

8. The system of claim 1, wherein the tool projections, and the card projections formed therefrom, have the height of 0.003 inches; and wherein the tool projections, and the card projections formed therefrom, have the width of 0.037 inches.

9. A system for creating card stock with an indicator, comprising:
a tool with a tool edge, the tool edge comprising a top tool edge, a bottom tool edge, a right tool edge, and left tool edge, and four rounded corners each located between two of the tool edges;
a plurality of tool projections over at least a portion of the top took edge and at least a portion of the right tool edge or the left tool edge, the tool projections comprising peaks and troughs, wherein the projections are saw-tooth projections or rounded projections, and wherein the tool projections are uniform;
wherein a width distance between the peaks of the plurality of tool projections that are adjacent is less than or equal to 0.05 inches;
wherein a height distance between the peaks of the plurality of tool projections and the troughs of the plurality of tool projections is less than or equal to 0.005 inches;
wherein the tool is configured to form card stock from sheet stock;
wherein the card stock comprises an indicator over at least a portion of an edge of the card stock formed from the plurality of tool projections;
wherein the card stock formed from the tool comprises:
a first face;
a second face opposite the first face;
a card edge around the card stock between the first face and the second face, wherein the card edge comprises a top card edge, a bottom card edge, a right card edge, and a left card edge, and four rounded corners each located between two of the card edges;
an indicator on at least a portion of the top card edge and at least a portion of the right card edge or left card edge, wherein the indicator comprises a plurality of card projections comprising peaks and troughs, wherein the plurality of card projections are rounded uniform projections formed from the saw-tooth tool projections;
wherein the plurality of card projections have a width that is less than or equal to 0.05 inches; and
wherein the plurality of card projections have a height that is less than or equal to 0.005 inches.

10. The system of claim 9, wherein the card stock is configured for use in financial transaction machines with the plurality of projections on at least the portion of the top card edge and at one of the rounded card corners; and wherein the indicator is configured for being seen or touched when the card stock is inserted into a wallet exposing the top card edge or inserted into a wallet exposing one of the rounded card corners adjacent the top edge.

11. The system of claim 9, wherein the tool projections, and the card projections formed therefrom, have the height that ranges from 0.001 to 0.005; and wherein the tool projections, and the card projections formed therefrom, have the width that ranges from 0.010 to 0.05 inches, inclusive.

12. A method for creating card stock with an indicator, comprising:
forming card stock from sheet stock using a tool with a tool edge, wherein the tool edge comprises a top tool edge, a bottom tool edge, a right tool edge, and left tool edge, and four rounded tool corners each located between two of the tool edges;
wherein the tool edge comprises a tool projection over at least a portion of the top tool edge and at one of the rounded tool corners adjacent the top tool edge, the tool projections comprising peaks and troughs, wherein the projections are saw-tooth projections or rounded projections, and wherein the tool projections are uniform;
wherein the tool projections have a width that is less than or equal to 0.05 inches;
wherein the tool projections have a height that is less than or equal to 0.005 inches; and
wherein the card stock comprises:
a first face;
a second face opposite the first face;
a card edge around the card stock between the first face and the second face, wherein the card edge comprises a top card edge, a bottom card edge, a right card edge, and a left card edge, and four rounded corners each located between two of the card edges;
an indicator over at least a portion of the top card edge and at one of the rounded card corners adjacent the top card edge, wherein the indicator comprises a plurality of card projections comprising peaks and troughs, wherein the plurality of card projections are rounded uniform projections formed from the saw-tooth tool projections or the rounded tool projections;
wherein the plurality of card projections have a width that is less than or equal to 0.05 inches; and
wherein the plurality of card projections have a height that is less than or equal to 0.005 inches.

13. The method of claim 12, further comprising:
procuring two or more layers for the sheet stock; and
securing the two or more layers into the sheet stock.

14. The method of claim 13, wherein securing the two or more layers into the sheet stock comprises laminating the two or more layers through the use of two or more rollers.

15. The method of claim 13, wherein securing the two or more layers into the sheet stock comprises laminating the two or more layers in a heated press that applies heat and pressure to the two or more layers.

16. The method of claim 12, wherein the sheet stock comprises:
a core layer formed molded plastic;
an outer layer representing a first face of the card stock; and
an outer layer representing a second face of the card stock.

17. The method of claim 12, wherein the card stock is configured for use in financial transaction machines with the plurality of projections on at least the portion of the top card edge and at one of the rounded card corners; and wherein the indicator is configured for being seen or touched when the card stock is inserted into a wallet exposing the top card edge or inserted into a wallet exposing one of the rounded card corners adjacent the top edge.

18. The method of claim 12, wherein the tool projections, and the card projections formed therefrom, have the height that ranges from 0.001 to 0.005; and wherein the tool projections, and the card projections formed therefrom, have the width that ranges from 0.010 to 0.05 inches, inclusive.

19. The method of claim 12, wherein the tool projections, and the card projections formed therefrom, have the height of 0.003 inches; and wherein the tool projections, and the card projections formed therefrom, have the width of 0.037 inches.

20. The method of claim 12, further comprising:
applying a signature panel to the back of the card stock;
applying a hologram to the front of the card stock;

personalizing the card stock with customer account information and a customer name; and wherein a financial institution card is created from the card stock.

* * * * *